(12) United States Patent
Spink et al.

(10) Patent No.: US 7,752,397 B2
(45) Date of Patent: *Jul. 6, 2010

(54) REPEATED CONFLICT ACKNOWLEDGEMENTS IN A CACHE COHERENCY PROTOCOL

(75) Inventors: Aaron Spink, San Francisco, CA (US); Robert Beers, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/351,737

(22) Filed: Jan. 9, 2009

(65) Prior Publication Data

US 2009/0119462 A1    May 7, 2009

Related U.S. Application Data

(63) Continuation of application No. 11/479,576, filed on Jun. 30, 2006, now Pat. No. 7,536,515.

(51) Int. Cl.
*G06F 13/14* (2006.01)
(52) U.S. Cl. ...................................... 711/141
(58) Field of Classification Search ........................ None
See application file for complete search history.

(56) References Cited

U.S. PATENT DOCUMENTS

| | | | |
|---|---|---|---|
| 5,966,729 A | 10/1999 | Phelps | |
| 6,009,488 A | 12/1999 | Kavipurapu | |
| 6,631,401 B1 | 10/2003 | Keller et al. | |
| 6,631,448 B2 | 10/2003 | Weber | |
| 6,704,842 B1 | 3/2004 | Janakiraman et al. | |
| 6,922,756 B2 | 7/2005 | Hum et al. | |
| 6,954,829 B2 | 10/2005 | Beers et al. | |
| 7,107,409 B2 | 9/2006 | Glasco | |
| 2004/0122966 A1 | 6/2004 | Hum et al. | |
| 2004/0123045 A1 | 6/2004 | Hum et al. | |
| 2004/0123047 A1 | 6/2004 | Hum et al. | |
| 2005/0144400 A1 | 6/2005 | Hum et al. | |
| 2005/0237941 A1 | 10/2005 | Beers et al. | |
| 2005/0240734 A1 | 10/2005 | Batson et al. | |
| 2006/0053257 A1 | 3/2006 | Sistla et al. | |
| 2008/0005483 A1 | 1/2008 | Spink et al. | |

OTHER PUBLICATIONS

Office Action for U.S. Appl. No. 11/480,102 mailed May 23, 2008, 13 pgs.
Hum, et al., "Pending U.S. Appl. 11/447,384, filed Jun. 5, 2006".
USPTO, "Notice of Allowance Mailed Dec. 24, 2008 for U.S. Appl. No. 11/479,576", filed Dec. 24, 2008, Whole Document.
USPTO, "Mailed Jun. 16, 2008 for U.S. Appl. No. 11/479,576", filed Jun. 16, 2008, Whole Document.

(Continued)

*Primary Examiner*—Tuan V Thai
*Assistant Examiner*—Duc T Doan
(74) *Attorney, Agent, or Firm*—Blakely, Sokoloff, Taylor & Zafman LLP

(57) ABSTRACT

In a cache coherency protocol multiple conflict phases may be utilized to resolve a data request conflict condition. The multiple conflict phases may avoid buffering or stalling conflict resolution, which may reduce system inefficiencies.

16 Claims, 7 Drawing Sheets

OTHER PUBLICATIONS

USPTO, "Notice of Allowance Mailed Nov. 3, 2008 for U.S. Appl. No. 11/479,179", filed Nov. 3, 2008, Whole Document.
USPTO, "Mailed Apr. 21, 2008 for U.S. Appl. No. 11/479,179", filed Apr. 21, 2008, Whole Document.
USPTO, "Final Office Action for U.S. Appl. No. 11/480,102", filed Oct. 30, 2008, Whole Document.
USPTO, "Office Action, U.S. Appl. No. 11/480,102, Mailed Mar. 17, 2009", Whole Document.
Pending U.S. Appl. No. 11/447,384, filed Jun. 5, 2006; inventor: Hum et al.
Office Action for U.S. Appl. No. 11/480,102 mailed May 23, 2008, 13 pgs.

REPEATED CONFLICT ACKNOWLEDGEMENTS IN A CACHE COHERENCY PROTOCOL

RELATED APPLICATIONS

This application is a continuation of U.S. patent application Ser. No. 11/479,576 filed Jun. 30, 2006, now U.S. Pat. No. 7,536,515, entitled REPEATED CONFLICT ACKNOWLEDGEMENTS IN A CACHE COHERENCY PROTOCOL.

TECHNICAL FIELD

Embodiments of the invention relate to a cache coherency protocol. More particularly, embodiments of the invention relate to resolution of conflicts in a system having multiple caching agents.

BACKGROUND

When an electronic system includes multiple cache memories, the validity of the data available for use must be maintained. This is typically accomplished by manipulating data according to a cache coherency protocol. As the number of caches and/or processors increases, the complexity of maintaining cache coherency also increases.

When multiple components (e.g., a cache memory, a processor) request the same block of data the conflict between the multiple components must be resolved in a manner that maintains the validity of the data. Current cache coherency protocols typically have a single component that is responsible for conflict resolution. However, as the complexity of the system increases, reliance on a single component for conflict resolution can decrease overall system performance.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
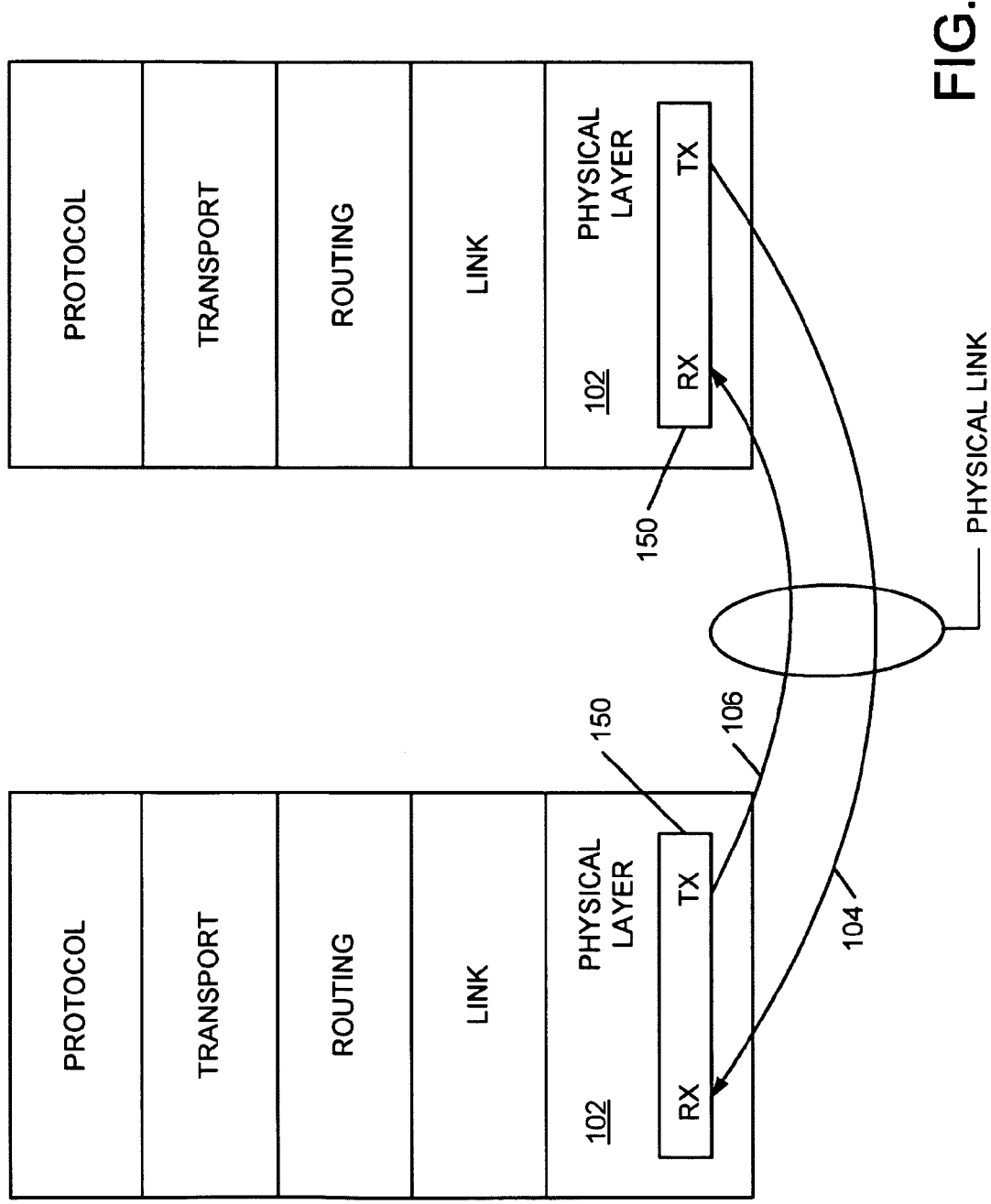
FIG. 1 is a block diagram of one embodiment of an apparatus for a physical interconnect.

Techniques for distributed cache coherency conflict resolution in a multi-node system are described. In the following description, numerous specific details are set forth. However, embodiments of the invention may be practiced without these specific details. In other instances, well-known circuits, structures and techniques have not been shown in detail in order not to obscure the understanding of this description.

The cache coherency protocol described herein provides a snooping protocol without the limitations of a single, serializing bus. The protocol relies on nodes with cached copies of data to maintain coherency. In one embodiment, nodes are interconnected through point-to-point links between caching agents. In one embodiment, the cache coherency protocol may provide distributed conflict resolution by having nodes identify potential conflicts and involve the Home node in the resolution process. The Home node may participate in every transaction without being on the critical path in order to resolve conflicts.

The cache coherency protocol involves broadcasting an initial request to all peer nodes as well as the Home node. A conflict will be detected if each node monitors for conflicts after making a request. Because all nodes must respond to a broadcast request either by supplying the data or indicating they do not have a copy, the response can include an indication of a conflict, so conflicting nodes will detect the conflict.

Under certain conditions a requesting node may have received the requested data and acknowledged receipt to the Home node. However, before a completion message is received from the Home node, a conflicting request may be received from a peer node. This may be referred to as a "late conflict" condition. Techniques for resolution of the late conflict condition are described herein.

In the cache coherence protocol described herein, a coherent request from a requesting caching agent may go through two phases: Request phase and Acknowledge Conflict (AckCnflt) phase. The request phase may be initiated when the request is sent to the Home agent. The request phase may end when the requesting caching agent receives the requested data and a completion message from the Home agent or, in the case of a conflict, when the requesting caching agent sends its conflict acknowledgement packet to the Home agent. The AckCnflt phase may be initiated only when a conflict acknowledgement packet is sent. The AckCnflt phase may end when a forward request message or a second completion message is received.

During an AckCnflt phase for one of the requests, a caching agent must not respond to external snoop requests to the same address as the request. This prevents introduction of additional conflicts during the AckCnflt stage. In one embodiment, during the AckCnflt phase, the Home agent may extend ownership to known conflicts or end the conflict chaining so that snoops may again invoke direct cache-to-cache transfers. Blocking snoops introduces delays in releasing resources and, with limited resources available for snoops, increases the difficulty of avoiding system deadlocks. The second AckCnflt phase for a request may allow snoops to continue to be processed and thus not be blocked by a caching agent.

FIG. 1 is a block diagram of one embodiment of an apparatus for a physical interconnect. In one aspect, the apparatus depicts a physical layer for a cache-coherent, link-based interconnect scheme for a processor, chipset, and/or IO bridge components. For example, the physical interconnect may be performed by each physical layer of an integrated device.

Specifically, the physical layer may provide communication between two ports over a physical interconnect comprising two uni-directional links. Specifically, one unidirectional link 104 from a first transmit port 150 of a first integrated device to a first receiver port 150 of a second integrated device. Likewise, a second unidirectional link 106 from a first transmit port 150 of the second integrated device to a first receiver port 150 of the first integrated device. However, the claimed subject matter is not limited to two uni-directional links.

Figure 2:
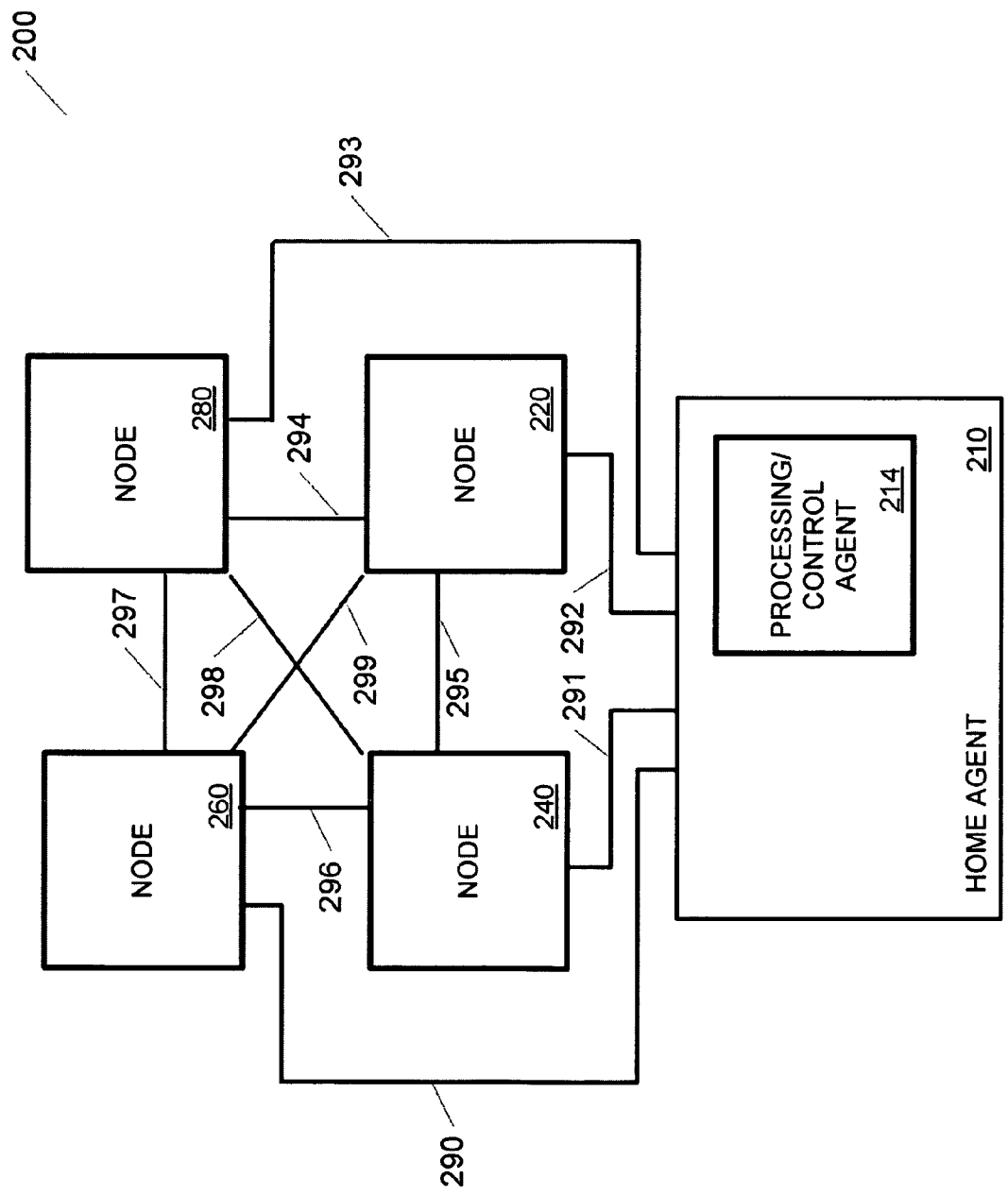
FIG. 2 is a block diagram of a group of nodes interconnected with a home agent.

FIG. 2 is a block diagram of a group of nodes interconnected with a home agent. The example of FIG. 2 includes nodes and a home agent. However, any number of nodes may be coupled with a home agent. The nodes and home agent may be referred to as a "cluster" that may be a part of a larger system. In one embodiment, one or more of the nodes may have a memory system that may include any type of non-cache memory, for example, dynamic random access memory (DRAM), static random access memory (SRAM), etc.

The four nodes (220, 240, 260 and 280) may be any type of system component having a cache memory, for example, a processor. In one embodiment, the nodes and home agent may be interconnected via multiple point-to-point links (290, 291, 292, 293, 294, 295, 296, 297, 298, and 299) as described with respect to FIG. 1.

In one embodiment, node controller 110 may include processing/control agent 114. Processing/control agent 114 may provide all or a portion of the functionality provided by node controller 110. Processing/control agent 114 may be implemented as hardware, software, firmware, or any combination thereof Node controller 110 may also include additional circuits and functionality. In one embodiment, node controller 110 may be a gateway for communication beyond the cluster. Node controller 110 may also operate as a proxy home or caching agent for the home agents of remote clusters, if any. Node controller 110 may also serve as a proxy for the caching agents in the local cluster.

Figure 3A:
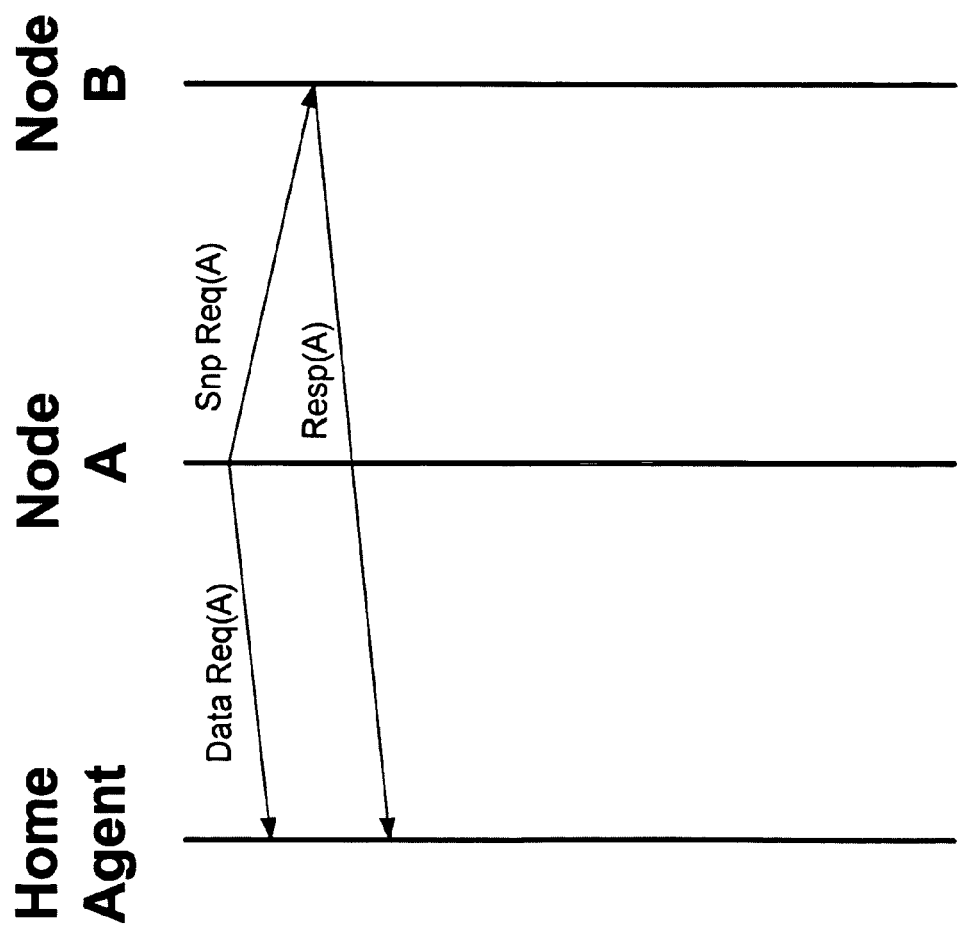
FIGS. 3A-3D illustrate a late conflict condition in a multi-node system that may be resolved with repeated conflict acknowledgement messages.

FIG. 3A is a conceptual illustration of a node requesting data in a multi-node system. FIG. 3A includes two peer nodes (Node A and Node B) and one Home Agent for reasons of simplicity of description only. A system may have any number of peer nodes and any number of Home Agents. In one embodiment a Home Agent may operate as a proxy for multiple peer nodes when interacting with remote nodes.

To request a block of data, Node a may transmit a Data Request (Data Req(A)) message to the Home Agent and a Snoop Request (SnpReq(A)) message to all peer nodes. The requested block of data may be any size block of data, for example, a cache line or a byte of data. In response to the Snoop Request message, the peer node(s) may respond to the Home Agent with a Response (Resp(A)) message indicating whether or not the peer node sending the Response message has a cached copy of the requested data and the state of the data (e.g., Modified, Invalid).

Figure 3B:
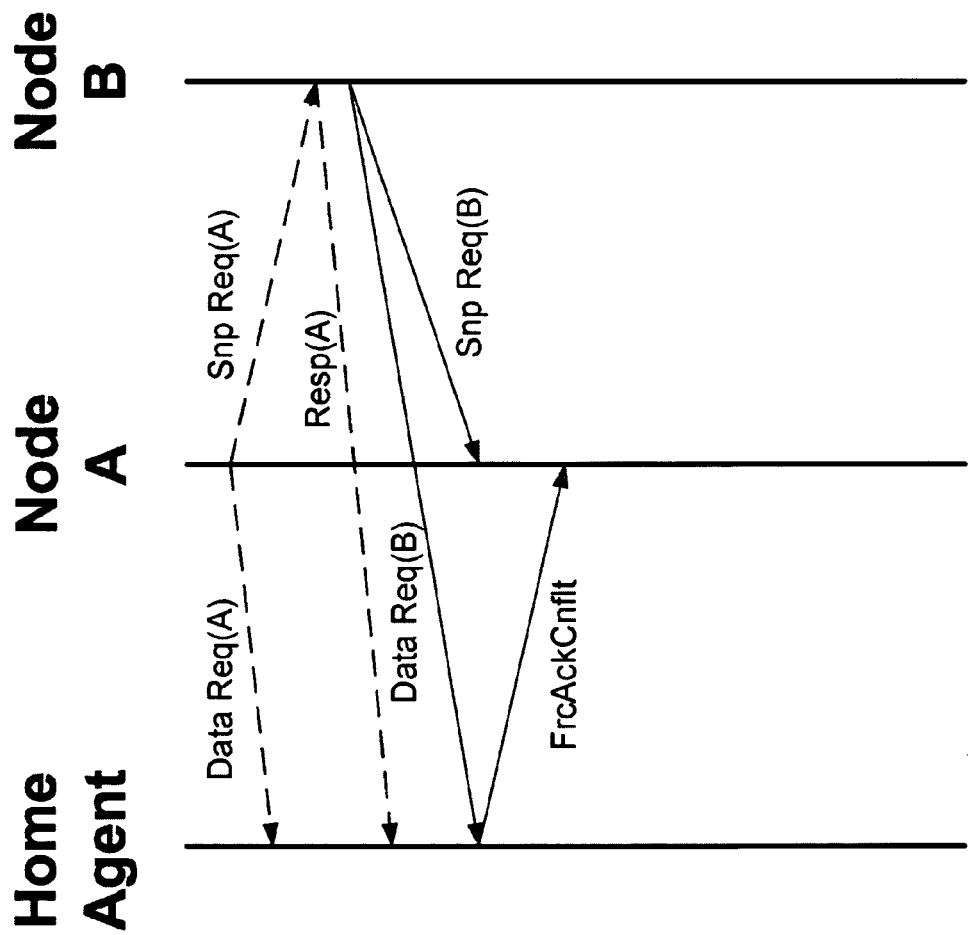

FIG. 3B is a conceptual illustration of a second peer node generating a conflicting request for data. In the illustration of FIG. 3B, the messages described with respect to FIG. 3A are illustrated with dashed lines while the subsequent messages described with respect to FIG. 3*b* are illustrated with solid lines.

After sending the Response message, but before Node A has received ownership of the requested data, Node B may request the block of data by sending a Data Request (Data Req(B)) message to the Home Agent and a Snoop Request (SnpReq(B)) message to all peer nodes. In response to receiving the conflicting Data Request message, the Home Agent may send a Force Acknowledge Conflict (FrcAckCnflt) message to Node A, the node sending the first Data Request message. The Snoop Request message from Node B may be received after Node A receives the Force Acknowledge Conflict message.

Figure 3C:
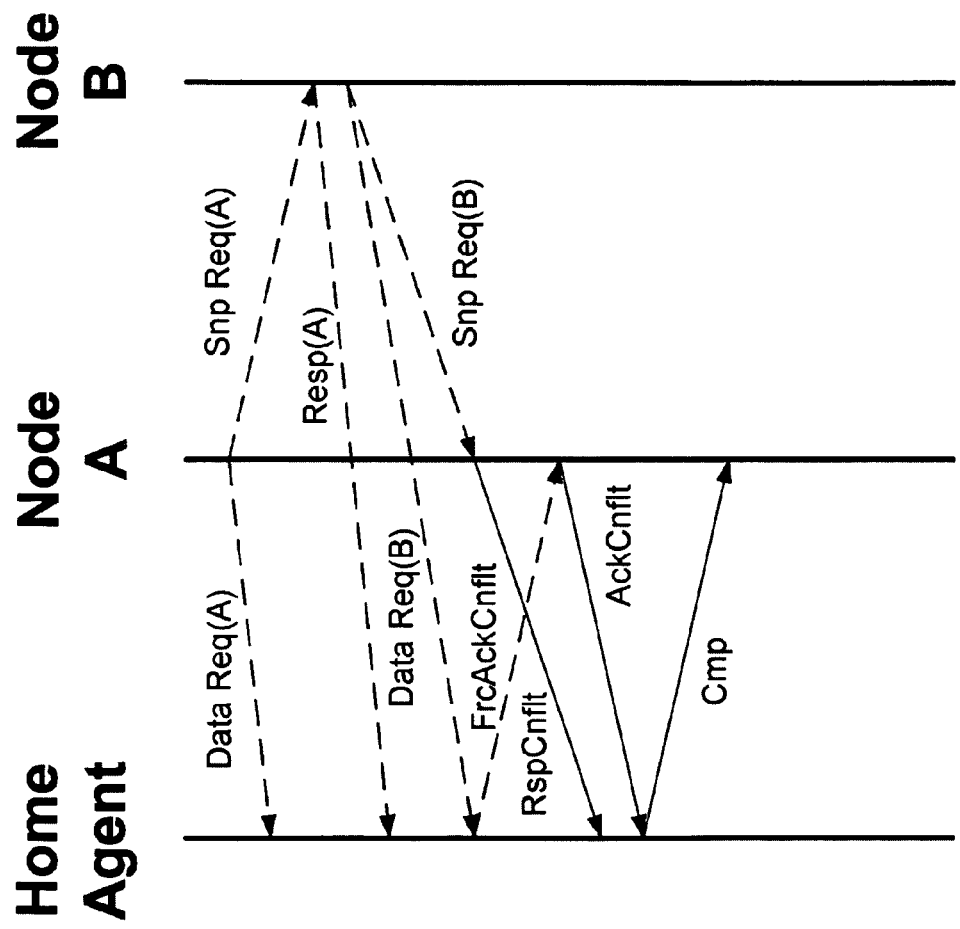

FIG. 3C is a conceptual illustration of a first conflict phase in response to conflicting data requests. The Force Acknowledge Conflict message described with respect to FIG. 3B may initiate the first conflict phase. Thus, the Snoop Request message from Node B may be received by Node A during the first conflict phase.

In one embodiment, when Node A receives the conflicting Snoop Request message from Node B, Node A may send a Response Conflict (RspCnflt) message to the Home Agent. Without the Force Acknowledge Conflict message, Node A may be required to buffer the conflicting Snoop Request message. However, by having the functionality to support multiple conflict phases, Node A can respond to the conflicting Snoop Request message with a Response Conflict (RspCnflt) message to the Home Agent. This will result in the second conflict phase.

In response to the Force Acknowledge Conflict message, Node A may send an Acknowledge Conflict message to the Home Agent. The Home Agent may respond to the Acknowledge Conflict message from Node A with a Complete (Cmp) message to complete the first conflict phase. The complete message may include the requested data and/or data state information.

Figure 3D:
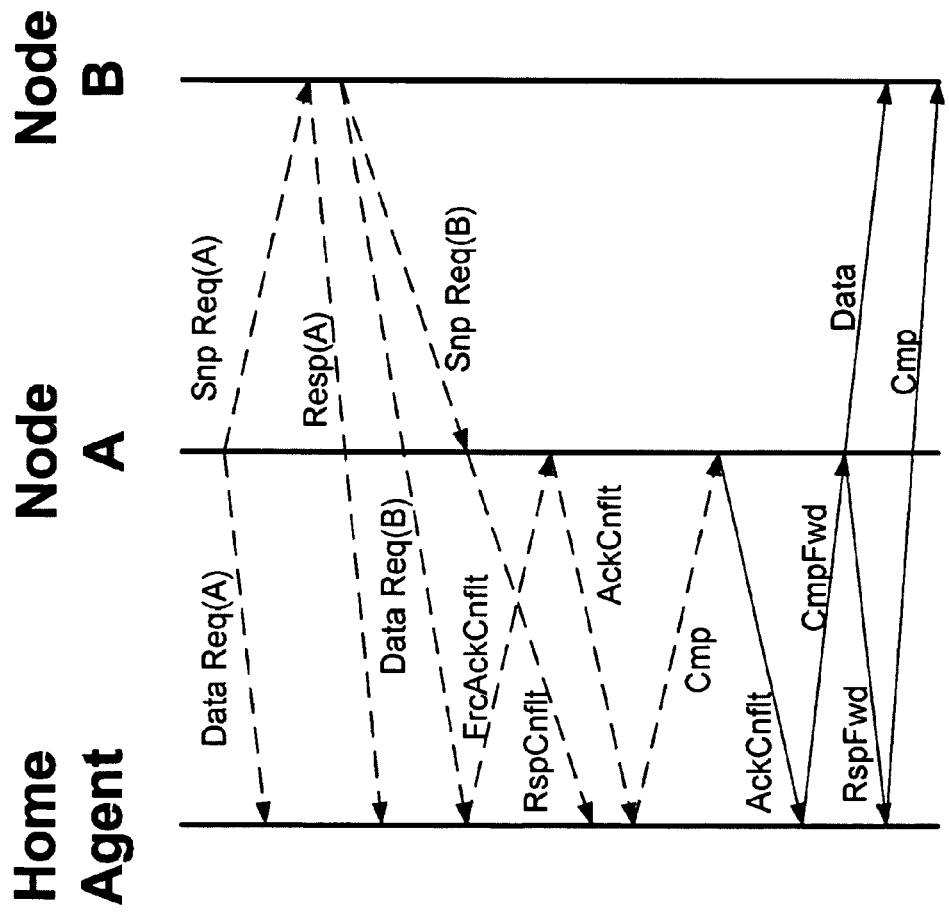

FIG. 3D is a conceptual illustration of a second conflict phase in response to conflicting data requests. As discussed above, the second conflict phase may be in response to the Response Conflict message sent by Node A to the Home Agent.

In response to the Complete message from the Home Agent, Node A may send a second Acknowledge Conflict (AckCnflt) message to the Home Agent. The second conflict phase may allow the Home Agent to send a Complete Forward (CmpFwd) message to Node A to cause Node A to forward the requested data to Node B after Node A has finished processing the data.

In response to the Complete Forward message, Node A may forward the data to Node B and send a Response Forward (RspFwd) message to the Home Agent indicating that the data has been forwarded to Node B. In response to receiving the Response Forward message the Home Agent may send a Complete (Cmp) message to Node B indicating that the request has been completed.

At this point, Node B may own the requested data, while Node A has used the requested data in response to the original request. Node A has received two Complete messages to resolve the two conflict phases and Node B has received a Complete message to indicate the requested data has been provided and no further requests for the data are pending. Thus, Node A was able to process a conflicting Snoop Request message without blocking the Snoop Request, which may help avoid deadlock conditions.

Figure 4:
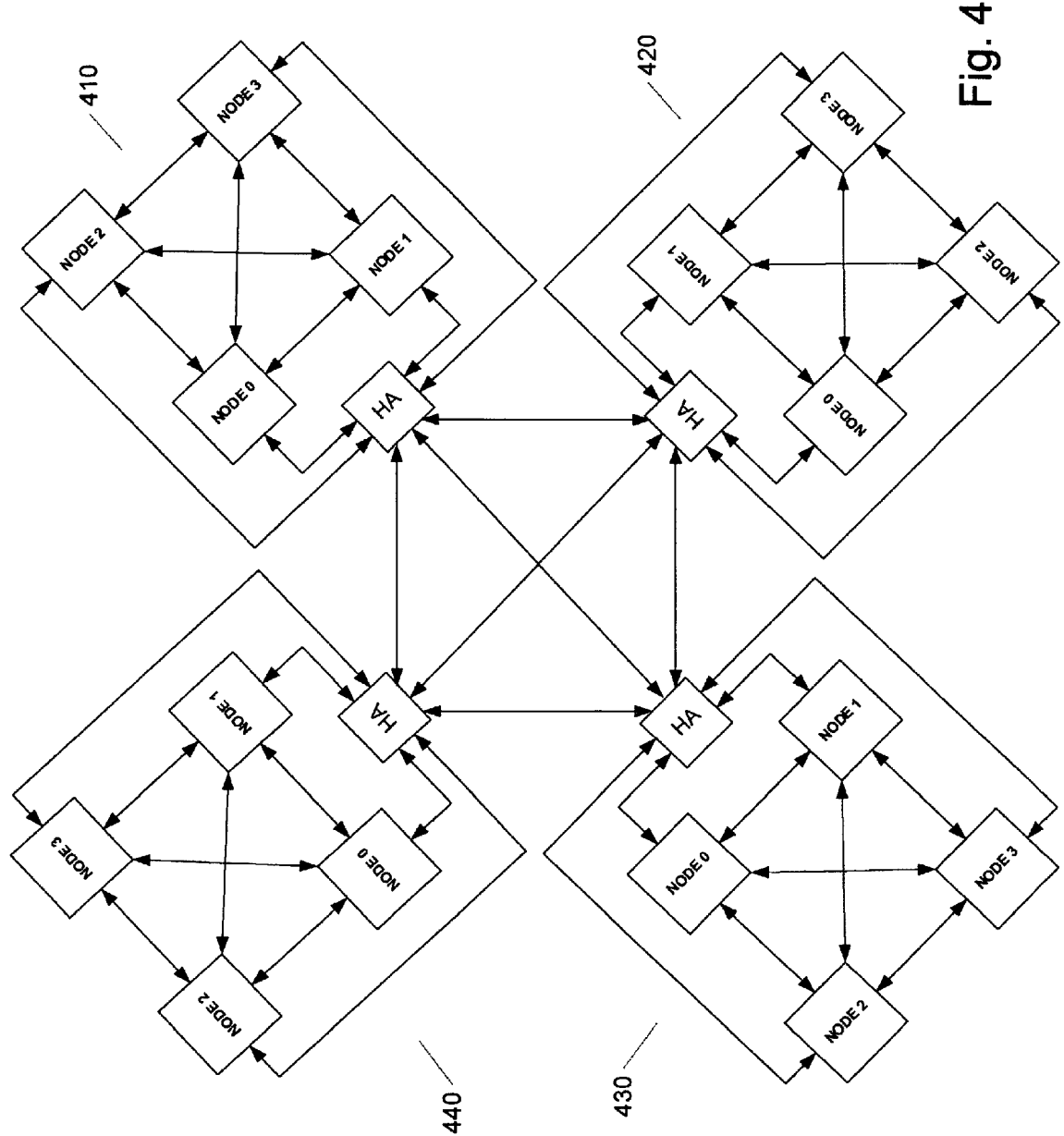
FIG. 4 is a block diagram of a hierarchical system having multiple home agents.

FIG. 4 is a block diagram of a hierarchical system having multiple home agents. FIG. 4 illustrates an example architecture of interconnecting four home agents with their corresponding nodes. In one embodiment, the home agents may interact utilizing the same messaging protocol as is used between the nodes.

In one embodiment, each cluster (410, 420, 430, 440) is configured similarly to the cluster of FIG. 2 where a group of nodes are interconnected via point-to-point links with a home agent. The home agents may also be interconnected via point-to-point links. This allows a home agent to represent a group of nodes to a larger system in a hierarchical manner. The architecture may be further expanded by including a home agent to represent clusters 410, 420, 430 and 440 to other groups of clusters.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
exchanging communications between a first node cluster in a multi-node system and a second node cluster in the multi-node system, each of the first node cluster and the second node cluster including:
a respective set of nodes, each node in the respective set of nodes including at least a cache memory, and
a respective home agent connected to the respective set of nodes;
the exchanging the communications including:
receiving at a first home agent a request for a block of data from a first node in the multi-node system,
generating a first conflict message to send from the first home agent to initiate a first conflict phase, the generating the first conflict message in response to the first home agent receiving a conflicting request for the block of data from a second node in the multi-node system,
sending from the first home agent to the first node a completion message corresponding to the request from the first node,
sending, with the first node, a second conflict message to the first home agent, the second conflict message to initiate a second conflict phase, and
completing the second conflict phase by providing the requested block of data to the first node and to the second node in turn;
wherein the respective home agents of the first node cluster and the second node cluster are coupled to one another via a point-to-point link; and
wherein one of the home agents of the first node cluster and the second node cluster operates for the communications as a proxy agent of another home agent of the multi-node system or a node of the multi-node system.

2. The method of claim 1 wherein each node in the multi-node system is interconnected with a bi-directional point-to-point link and each node communicates with each other node in the multi-node system.

3. The method of claim 1 wherein completing the second conflict phase by providing the requested block of data to the first node and to the second node in turn comprises a home agent sending the requested block of data to one of the first node and the second node with a message to forward the requested block of data to the other of the first node and the second node upon completion of performing one or more operations utilizing the requested block of data.

4. The method of claim 1 wherein receiving the request for the block of data from the first node in the multi-node system comprises:
receiving a data request message from the first node; and
receiving a response message corresponding to the data request message from the second node.

5. The method of claim 1 wherein generating the first conflict message to initiate the first conflict phase in response to receiving the conflicting request for the block of data from the second node in the multi-node system comprises:
receiving, with the first home agent, a data request message for the block of data from the second node before the data request message from the first node has been resolved; and
sending, with the first home agent, a conflict message to cause the first node to enter a conflict phase.

6. An apparatus comprising:
a first node cluster and a second node cluster, the first node cluster to exchange communications with the second node cluster, each of the first node cluster and the second node cluster including:
a respective set of peer nodes, each peer node in the respective set of peer nodes including at least a cache memory, and
a respective home agent connected to the respective set of peer nodes,
the respective home agents of the first node cluster and the second node cluster coupled to one another via a first point-to-point link, one of the home agents of the first node cluster and the second node cluster to operate for the communications as a proxy agent of another home agent or a peer node;
wherein exchanging the communications includes:
a first peer node requesting a block of data not stored in a cache memory of the first peer node by sending a first data request message corresponding to the block of data to a first home agent and a snoop request message corresponding to the block of data,
a second peer node receiving the snoop request message from the first peer node,
the second peer node sending to the first home agent a second data request message corresponding to the block of data before the first data request message is resolved,
the first home agent receiving the first data request message from the first peer node and the second data request message from the second peer node,
the first home agent initiating a first conflict phase in response to the second data request message conflicting with the first data request message, the initiating by sending a first conflict message to the first peer node,
the first home agent sending to the first peer node a completion message corresponding to the request from the first peer node,
the first peer node sending a second conflict message to the first home agent, the second conflict message to initiate a second conflict phase, and
completing the second conflict phase by providing the requested block of data to the first peer node and to the second peer node in turn.

7. The apparatus of claim 6 wherein the first peer node and the second peer node are interconnected with a first bi-directional point-to-point link, the second peer node and the first home agent are interconnected with a second bi-directional point-to-point link, and the first peer node and the first home agent are interconnected with a third bi-directional point-to-point link.

8. The apparatus of claim 6, wherein completing the second conflict phase by providing the requested block of data to the first peer node and to the second peer node in turn comprises the first home agent sending the requested block of data to one of the first peer node and the second peer node with a message to forward the requested block of data to the other of the first peer node and the second peer node upon completion of performing one or more operations utilizing the requested block of data.

9. The apparatus of claim 6 wherein the first point-to-point link includes a bi-directional point-to-point link.

10. The apparatus of claim 9, wherein a second home agent remote from a node cluster of the first home agent provides the requested block of data in response to the first data request message.

11. A system comprising:
a first node cluster and a second node cluster, the first node cluster to exchange communications with the second node cluster, each of the first node cluster and the second node cluster including:
a respective set of peer nodes, each peer node in the respective set of peer nodes including at least a cache memory, and
a respective home agent connected to the respective set of peer nodes,
the respective home agents of the first node cluster and the second node cluster coupled to one another via a first point-to-point link, one of the home agents of the first node cluster and the second node cluster to operate for the communications as a proxy agent of another home agent or a peer node; and
a memory coupled with one of the peer nodes of the first node cluster and the second node cluster;
wherein exchanging the communications includes:
a first peer node requesting a block of data not stored in a cache memory of the first peer node by sending a first data request message corresponding to the block of data to a first home agent and a snoop request message corresponding to the block of data,
a second peer node receiving the snoop request message from the first peer node,
the second peer node sending to the first home agent a second data request message corresponding to the block of data before the first data request message is resolved,
the first home agent receiving the first data request message from the first peer node and the second data request message from the second peer node,
the first home agent initiating a first conflict phase in response to the second data request message conflicting with the first data request message, the initiating by sending a first conflict message to the first peer node,
the first home agent sending to the first peer node a completion message corresponding to the request from the first peer node,
the first peer node sending a second conflict message to the first home agent, the second conflict message to initiate a second conflict phase and
completing the second conflict phase by providing the requested block of data to the first peer node and to the second peer node in turn.

12. The system of claim 11 wherein the first peer node and the second peer node are interconnected with a first bi-directional point-to-point link, the second peer node and the first home agent are interconnected with a second bi-directional point-to-point link, and the first peer node and the first home agent are interconnected with a third bi-directional point-to-point link.

13. The system of claim 11, wherein completing the second conflict phase by providing the requested block of data to the first peer node and to the second peer node in turn comprises the first home agent sending the requested block of data to one of the first peer node and the second peer node with a message to forward the requested block of data to the other of the first peer node and the second peer node upon completion of performing one or more operations utilizing the requested block of data.

14. The system of claim 11, wherein the first point-to-point link includes a bi-directional point-to-point link.

15. The system of claim 14, wherein a second home agent remote from a node cluster of the first home agent provides the requested block of data in response to the first data request message.

16. The system of claim 11, wherein the first memory and the second memory include one of a dynamic random access memory and a static random access memory.

* * * * *